US008955257B2

(12) United States Patent
Moriya et al.

(10) Patent No.: US 8,955,257 B2
(45) Date of Patent: Feb. 17, 2015

(54) VEHICLE DOOR STRUCTURE INCLUDING LOCKING MEMBER PREVENTING MOVEMENT OF MOVEABLE MEMBER

(75) Inventors: Ryohei Moriya, Zama (JP); Takanori Yagi, Kanagawa-ken (JP); Masatsugu Mori, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/702,352

(22) PCT Filed: Jun. 6, 2011

(86) PCT No.: PCT/JP2011/062925
§ 371 (c)(1),
(2), (4) Date: Dec. 6, 2012

(87) PCT Pub. No.: WO2011/155438
PCT Pub. Date: Dec. 15, 2011

(65) Prior Publication Data
US 2013/0074413 A1 Mar. 28, 2013

(30) Foreign Application Priority Data
Jun. 8, 2010 (JP) ................................. 2010-130853

(51) Int. Cl.
*B60J 5/04* (2006.01)

(52) U.S. Cl.
USPC .................. 49/502; 296/146.1; 296/146.5

(58) Field of Classification Search
USPC .............................. 49/502; 296/146.1, 146.5
See application file for complete search history.

(56) References Cited

U.S. PATENT DOCUMENTS

| 4,382,622 A * | 5/1983 | Ishikawa .................... 292/216 |
| 4,919,473 A * | 4/1990 | Laimighofer et al. ... 296/187.12 |
| 6,065,797 A | 5/2000 | Shirasaka |
| 7,566,091 B2 * | 7/2009 | Yagi ........................ 296/146.6 |
| 7,648,192 B2 * | 1/2010 | Herline et al. ........... 296/187.12 |
| 8,235,451 B2 * | 8/2012 | Jordan et al. ............... 296/146.1 |
| 2010/0109350 A1 * | 5/2010 | Gschweng et al. ........... 292/196 |
| 2011/0258935 A1 * | 10/2011 | Heller ........................... 49/502 |
| 2012/0036785 A1 * | 2/2012 | Bedekar et al. ............... 49/394 |

FOREIGN PATENT DOCUMENTS

| JP | 10-266642 A | 10/1998 |
| JP | 11-081772 A | 3/1999 |

(Continued)

OTHER PUBLICATIONS

Russian Decision on Grant, Feb. 13, 2014, 8 pages.

*Primary Examiner* — Gregory J. Strimbu
(74) *Attorney, Agent, or Firm* — Foley & Lardner LLP (57) ABSTRACT

A vehicle width direction wall portion (29) and a front-rear direction wall portion (33) are formed in a stiffener (7) provided inside a front door (1), the vehicle width direction wall portion (29) extending in a vehicle width direction, the front-rear direction wall portion (33) extending from a vehicle width direction inner end (31) of the vehicle width direction wall portion (29) in a vehicle front-rear direction. Additionally, a locking member (23) is provided on the front-rear direction wall portion (33) at a portion, and faces a lock lever (25). The locking member engages the lock lever, after a load is inputted to an outside handle and a door outer panel thereby deforming the door outer panel, to prevent movement of the lock lever after the deforming the door outer panel.

5 Claims, 10 Drawing Sheets

(56) References Cited

FOREIGN PATENT DOCUMENTS

| | | |
|---|---|---|
| JP | 2005-113527 A | 4/2005 |
| JP | 2006-077490 A | 3/2006 |
| JP | 2006-151038 A | 6/2006 |
| JP | 2010-253836 A | 11/2010 |
| RU | 99119495 A | 12/2002 |
| SU | 385020 A1 | 5/1973 |

* cited by examiner

VEHICLE DOOR STRUCTURE INCLUDING LOCKING MEMBER PREVENTING MOVEMENT OF MOVEABLE MEMBER

TECHNICAL FIELD

The present invention relates to a vehicle door structure.

BACKGROUND ART

Conventionally, as shown in Japanese Patent Application Publication No. Hei 10(1998)-266642, for example, there has been known a vehicle in which an outside handle is turnably provided to a door outer panel constituting a door.

A latch device is provided at an end portion of the door. In a state where the door is closed, the latch device is engaged with a lock striker provided on a vehicle body side.

In addition, the outside handle is connected to the latch device through a wire or the like. Accordingly, when the outside handle is turned, tension acts on the wire, disengaging the latch device and the lock striker from each other, and thus the door can be opened.

SUMMARY OF INVENTION

However, in such a conventional door structure, a separate device needs to be provided to prevent the door from opening when a certain load toward an inner side of the vehicle is inputted to the outside handle. For this reason, an internal structure of the door becomes complicated, causing an increase in cost.

Accordingly, the present invention provides a vehicle door structure preventing a door from opening, with a simple structure, even when a certain load toward an inner side of the vehicle is inputted to an outside handle.

The present invention is a vehicle door structure in which: an outside handle is turnably supported on a door outer panel; a movable member capable of moving together with turn of the outside handle is provided on a door side; a latch device configured to engage and disengage a door with and from a vehicle body works in conjunction with the movement of the movable member; and a reinforcing member is arranged between the door outer panel and a door inner panel. A vehicle width direction wall portion and a front-rear direction wall portion are formed in the reinforcing member, the vehicle width direction wall portion extending in a vehicle width direction, the front-rear direction wall portion bending from an inner end, in the vehicle width direction, of the vehicle width direction wall portion and extending in a vehicle front-rear direction. Additionally, a locking member is provided on the front-rear direction wall portion at a portion facing the movable member.

In the vehicle door structure according to the present invention, when a load is inputted from a lateral side to the door, the vehicle width direction wall portion of the reinforcing member is deformed to be bent in such a way as to fall in the vehicle front-rear direction. For this reason, the outward deformation of the vehicle width direction wall portion in the vehicle width direction is suppressed, and the locking member provided on the front-rear direction wall portion is deformed and moved inward in the vehicle width direction to be locked to the movable member, thereby preventing the movement of the movable member. Hence, even when the load is transmitted to the outside handle, the engagement between the door and the vehicle body by the latch device is maintained and thus the door does not open. As described above, the present invention can prevent the door from opening, with a simple door structure, even when a certain load toward an inner side of the vehicle is inputted to the outside handle.

BRIEF DESCRIPTION OF DRAWINGS

FIGS. 10a and 10b are cross-sectional view views of a front door according to a comparative example. FIGS. 10a and 10b correspond to a cross-sectional view taken along the Y-Y line of FIG. 5 and a cross-sectional view taken along the Z-Z line of FIG. 5, respectively, and show a normal state before deformation.

FIGS. 11a and 11b are cross-sectional views of the front door according to the comparative example. FIGS. 11a and 11b correspond to a cross-sectional view taken along the Y-Y line of FIG. 5 and a cross-sectional view taken along the Z-Z line of FIG. 5, respectively, and show a state after the deformation.

DESCRIPTION OF EMBODIMENT

An embodiment of the present invention will be described below in detail with reference to the drawings.

Figure 1:
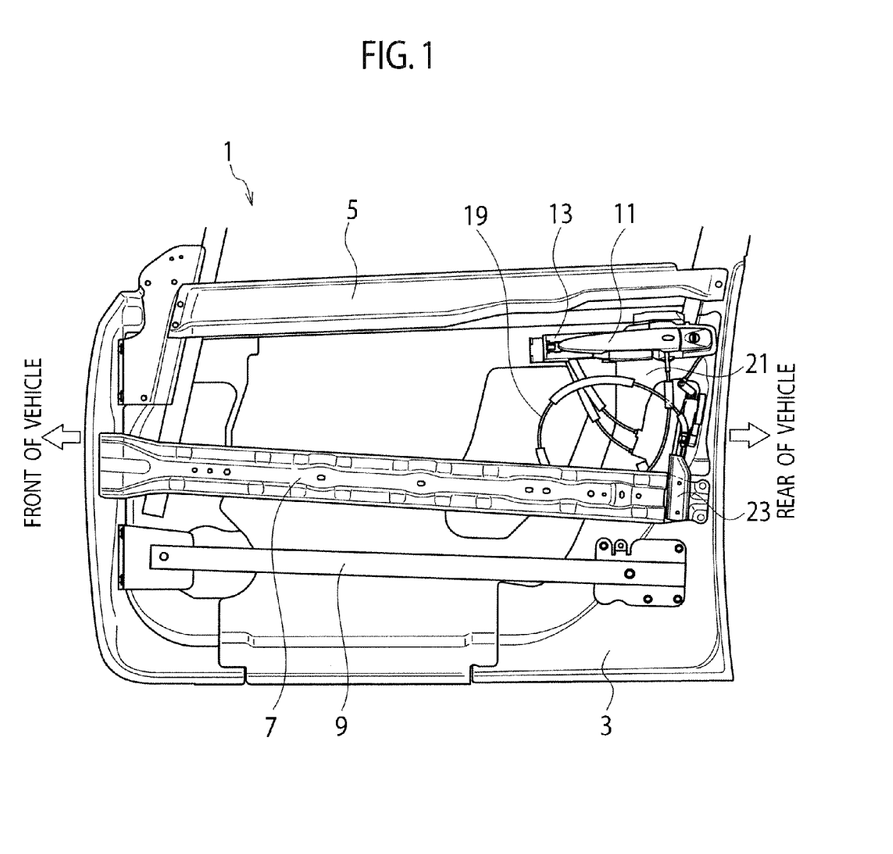
FIG. 1 is a side view of a front door employing a door structure according to an embodiment of the present invention, where a door outer panel is omitted.

As shown in FIG. 1, a door is openably and closably arranged on a side of a vehicle. While FIG. 1 illustrates a left front door, the invention pertains to a right front door as well. Three members are arranged on a door inner panel 3 in a vehicle front-rear direction in order to improve rigidity of each front door 1. To be specific, a reinforcement panel 5 is arranged at a door waist portion on the upper side, a stiffener 7 (reinforcing member) is arranged at the center in a top-bottom direction, and an impact beam 9 is arranged on the lower side.

Figure 2:
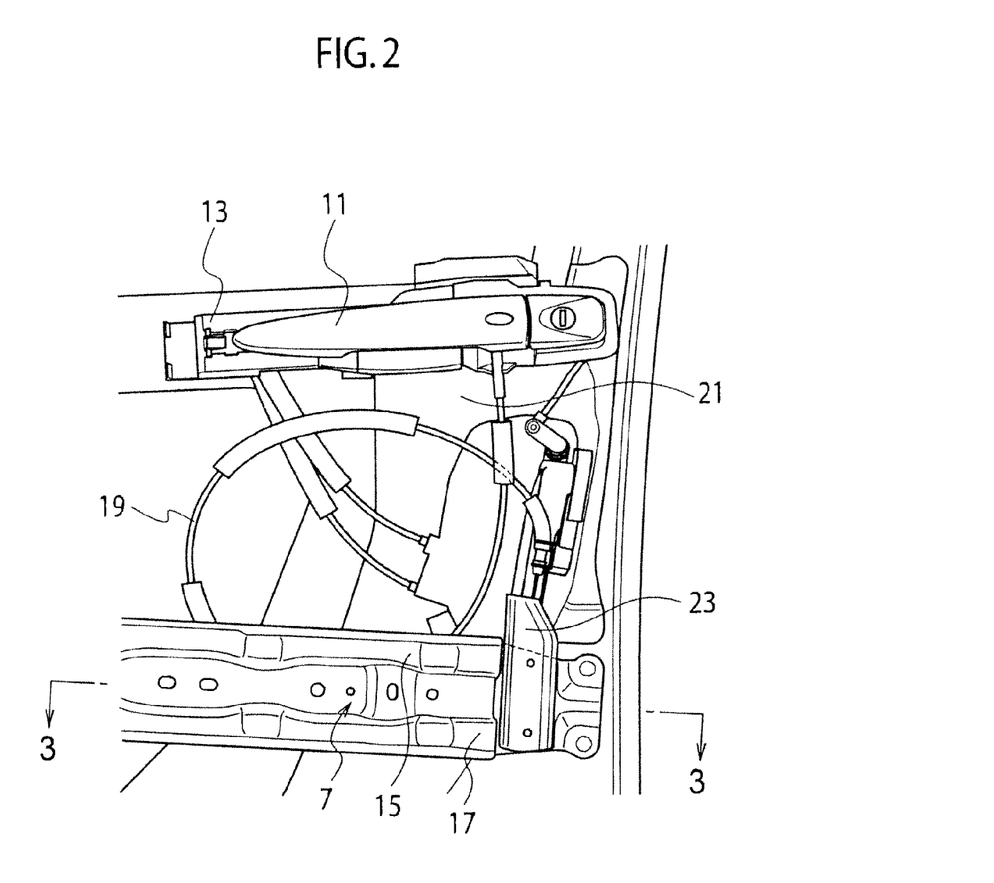
FIG. 2 is a side view enlarging a main portion of 1.

In addition, as shown in FIGS. 1 and 2, at an end portion below the reinforcement panel 5 and closer to the rear side of the vehicle, an outside handle 11 is turnably attached to a door outer panel 57 (illustrated in FIG. 3) through a door handle attachment member 13. Moreover, as shown in FIG. 2, an upper bead portion 15 and a lower bead portion 17 are formed in a vertical pair on an upper side and a lower side of the stiffener 7, respectively. A locking member 23, which is formed separately from the stiffener 7 as will be described later, is joined to a rear end portion of the stiffener 7. Note that a wire 19 extending from the outside handle 11 is connected to a door lock device 21.

Figure 3:
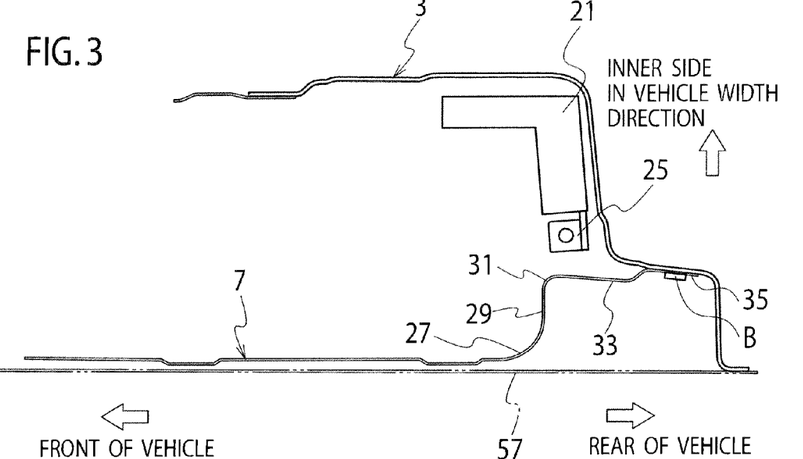
FIG. 3 is a cross-sectional view taken along a 3-3 line of FIG. 2.

As shown in FIG. 3, the door lock device 21 which has an inverse L shape in a plan view is arranged at a corner portion on a rear end side of the door inner panel 3, and a lock lever (movable member) 25 is turnably supported on the door lock device 21. In addition, a rear end portion of the stiffener 7 includes: a vehicle width direction wall portion 29 which bends inward in a vehicle width direction at a bending portion 27 located at an outer end in the vehicle width direction and extends in the vehicle width direction to an inner end in the vehicle width direction; and a front-rear direction wall portion 33 which bends at a vehicle width direction inner end 31 of the vehicle width direction wall portion 29 and extends rearward. A rear end 35 of the front-rear direction wall portion 33 is linked to a rear end of the door inner panel 3 with bolts B.

Figure 4:
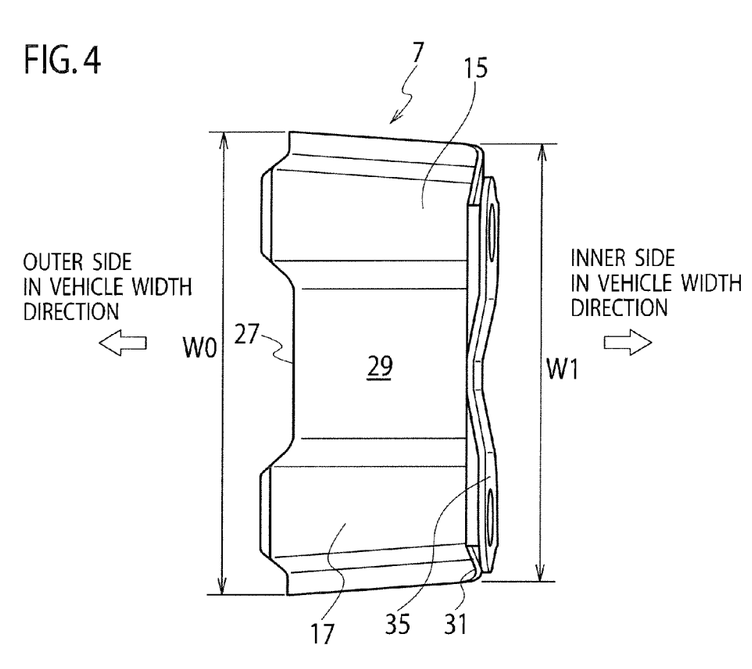
FIG. 4 is a side view of a stiffener according to the embodiment viewed from the rear of the vehicle.

As shown in FIG. 4, a top-bottom width dimension of the vehicle width direction wall portion 29 of the stiffener 7 is set to be gradually reduced toward an inner side in the vehicle width direction, and to be the minimum at the vehicle width direction inner end 31. In other words, when a top-bottom width of the vehicle width direction wall portion 29 at the bending portion 27 is W0, and a top-bottom width of the vehicle width direction wall portion 29 at the vehicle width direction inner end 31 is W1, the vehicle width direction wall portion 29 is formed to satisfy W0>W1. Additionally, in the vehicle width direction wall portion 29, the upper bead portion (bead portion) 15 is provided to extend in the vehicle width direction on the upper side, and the lower bead portion (bead portion) 17 is provided to extend in the vehicle width direction on the lower side. Incidentally, these upper bead portion 15 and lower bead portion 17 continue to the vehicle width direction inner end 31, and are not formed in the front-rear direction wall portion 33.

As described above, in the vehicle width direction wall portion 29, the top-bottom width dimension is set to be the minimum at the vehicle width direction inner end 31, and the upper bead portion 15 and the lower bead portion 17 are provided to extend to the vehicle width direction inner end 31. Thus, the vehicle width direction inner end 31 is formed as a fragile portion. In other words, rigidity of the vehicle width direction wall portion 29 is improved by the upper bead portion 15 and the lower bead portion 17 while rigidity of the front-rear direction wall portion 33 is improved by linking the locking member 23 thereto, and thus the vehicle width direction inner end 31 is a fragile portion which is easily bent.

Figure 5:
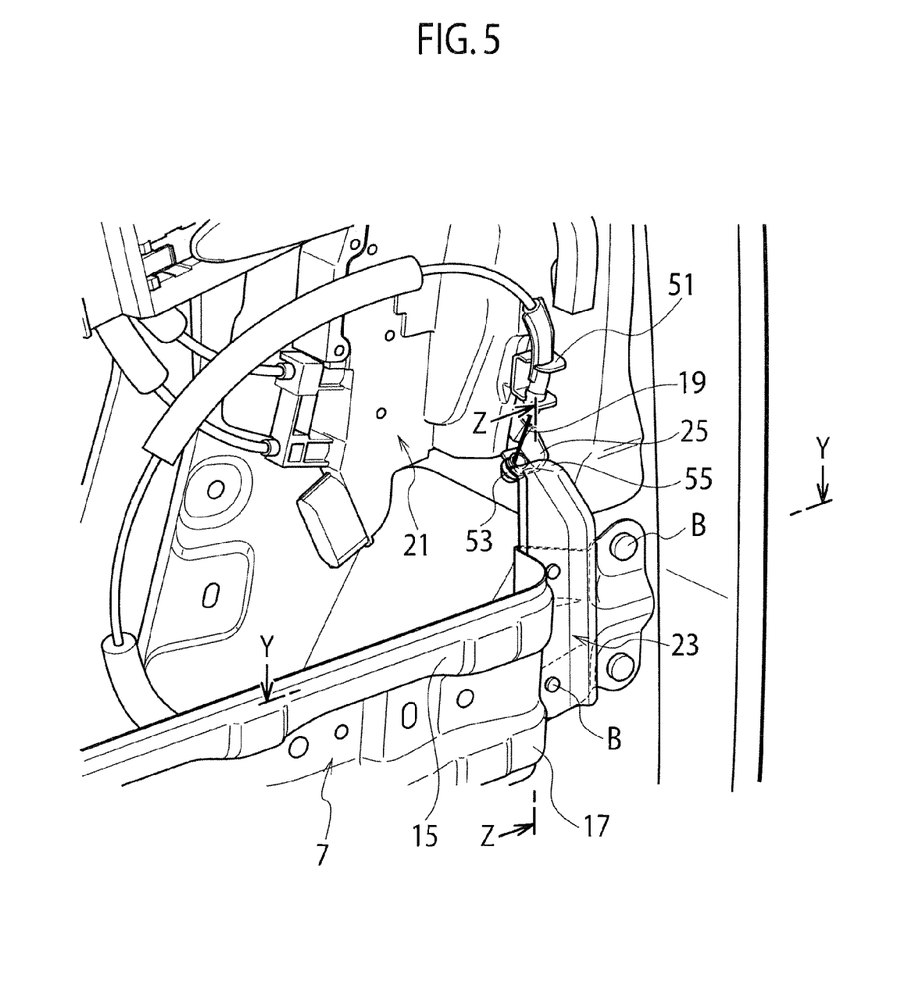
FIG. 5 is a perspective view of FIG. 2 viewed obliquely from the front, and shows a state where the stiffener is deformed upon input of a load toward an inner side in a vehicle width direction.

As shown in FIG. 5, an end portion of the wire 19 is supported with a hook 51 provided on the door lock device 21, and a tip end of the wire 19 is fixed to a wire supporting portion 53 of the lock lever 25. The lock lever 25 is supported on the door lock device 21 turnably in the top-bottom direction. On the other hand, a latch device not illustrated is provided to the door lock device 21, and a lock striker not illustrated is provided on a vehicle body side facing the latch device. In a closed state where the front door 1 is closed, the latch device and the lock striker are engaged with each other. Accordingly, when tension acts on the wire 19 by pulling the outside handle 11, the lock lever 25 turns upward to disengage the latch device (not illustrated) and the lock striker (not illustrated) from each other, thereby opening the front door 1. In addition, as shown in FIG. 5, the locking member 23 which is separate from the stiffener 7 is attached to the front-rear direction wall portion 33 of the stiffener 7 with bolts B at positions facing the wire supporting portion 53 of the lock lever (movable member) 25. Specifically, the locking member 23 is processed to be bent in a hat-section shape, and a claw portion 55 is bent and extends inward in the vehicle width direction at an upper end of the locking member 23. A height position of the claw portion 55 is disposed slightly higher than the wire supporting portion 53 of the lock lever 25 in the state where the front door 1 is closed. Hence, as will be described in detail later, when the locking member 23 is moved inward in the vehicle width direction as a result of deformation of the stiffener 7, the claw portion 55 of the locking member 23 holds the wire supporting portion 53 of the lock lever 25 from above to prevent the turn of the lock lever 25.

Next, a description will be given of the deformation behavior when a lateral load is inputted to the front door 1 (see FIG. 6) according to the embodiment.

Figure 6:
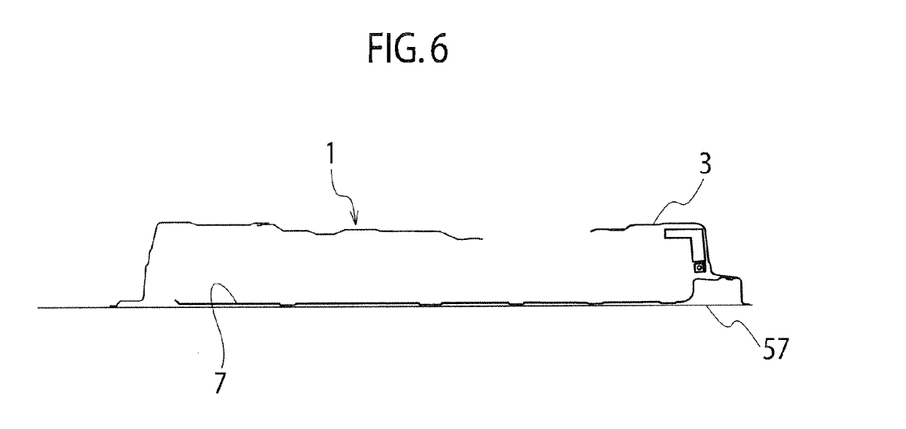
FIG. 6 is a cross-sectional view of the front door according to the embodiment.
Figure 7A:
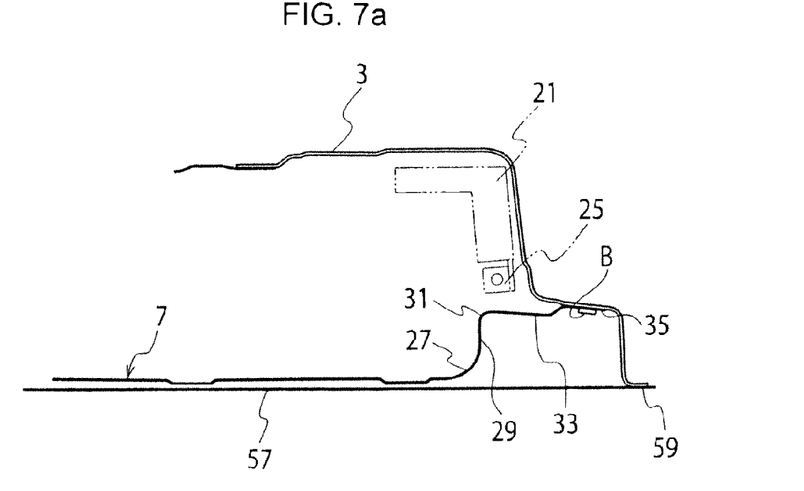
FIGS. 7a and 7b correspond to a cross-sectional view taken along a Y-Y line of FIG. 5 and a cross-sectional view taken along a Z-Z line of FIG. 5, respectively, and show a normal state before deformation.
Figure 7B:
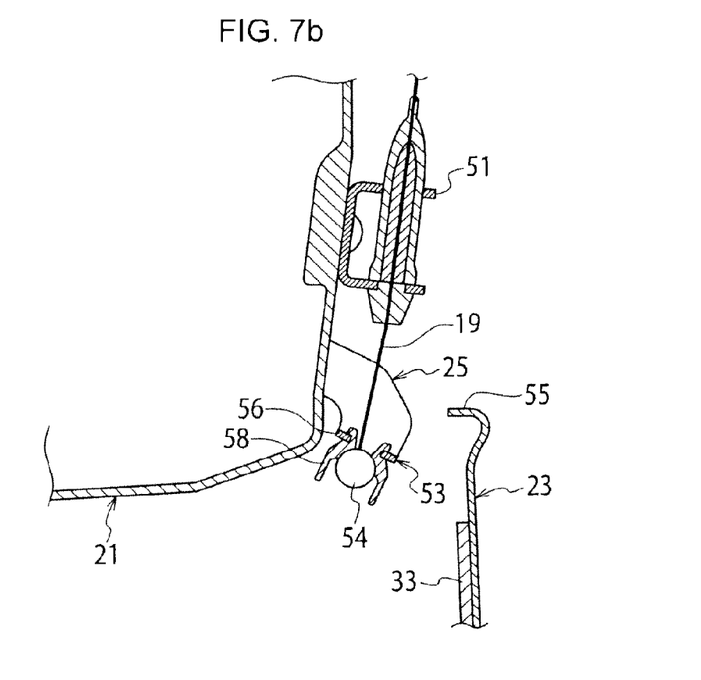

As shown in FIGS. 6 and 7, in a normal state where the front door 1 is closed and a load is yet to be inputted to the front door 1, the lock lever 25 is supported on the door lock device 21 turnably in the top-bottom direction. On an outer side of the lock lever 25 in the vehicle width direction, the front-rear direction wall portion 33 of the stiffener 7 is disposed close to and facing the lock lever 25. Note that, as shown in Part (b) of FIG. 7, a spherical buckle member 54 is attached to a tip end of the wire 19. On the other hand, a tubular supporting tool 58 is fitted to a locking piece 56 at a tip end of the wire supporting portion 53. The supporting tool 58 is open downward, and the buckle member 54 is locked to the supporting tool 58.

Figure 8A:
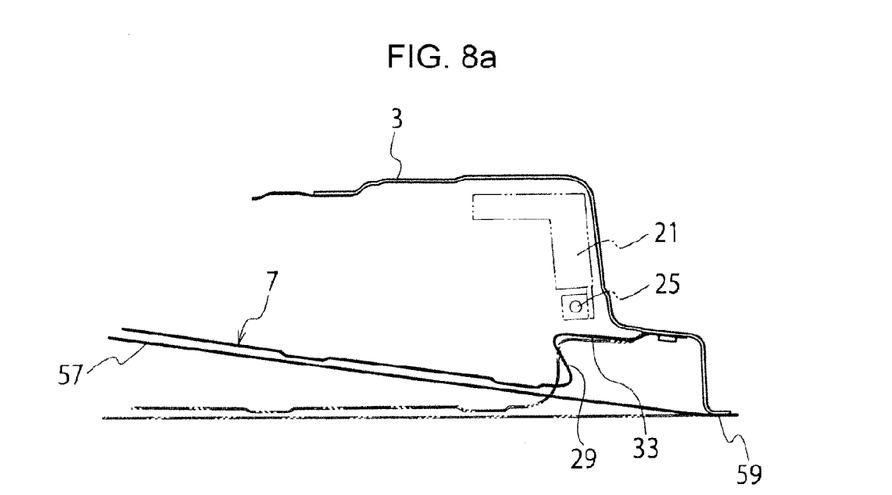
FIGS. 8a and 8b correspond to a cross-sectional view taken along the Y-Y line of FIG. 5 and a cross-sectional view taken along the Z-Z line of FIG. 5, respectively, and show a middle stage where the door outer panel and the stiffener are deformed upon input of a load toward an inner side in the vehicle width direction.
Figure 8B:
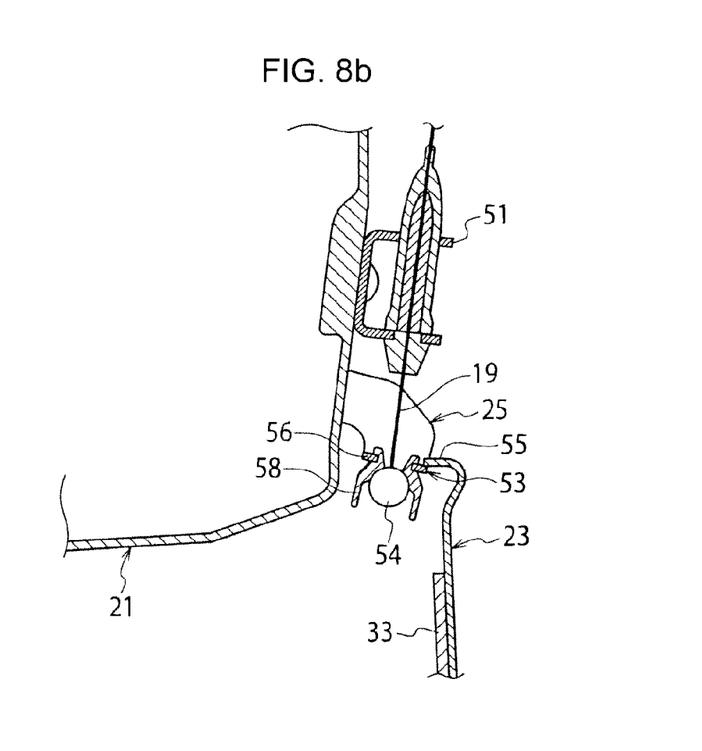

As shown in Part (a) of FIG. 8, when a load from an outer side to an inner side in the vehicle width direction is inputted to the door outer panel 57 and the outside handle 11, the door outer panel 57 is deformed in such a way that a front portion of the door outer panel 57 turns inward in the vehicle width direction about a rear end portion 59 thereof which is joined to the door inner panel 3. In addition, the stiffener 7 is also deformed and moved inward in the vehicle width direction as a result of being pushed by the door outer panel 57. Incidentally, the rear end 35 of the stiffener 7 is linked to the door inner panel 3 as described above. Hence, the vehicle width direction wall portion 29 is deformed to be bent in a substantially Z section shape as shown in Part (a) of FIG. 8, with the vehicle width direction inner end 31 and the bending portion 27 as origins. In addition, the locking member 23 is attached to the front-rear direction wall portion 33. For this reason, as shown in Part (b) of FIG. 8, the locking member 23 approaches the lock lever 25 by deformation and movement of the front-rear direction wall portion 33, so that a tip end of the claw portion 55 is locked to the locking piece 56 from above. In this way, upward movement of the lock lever 25 is prevented. Thus, even when a certain load is inputted from a lateral side to the outside handle 11, the lock lever 25 does not turn. Accordingly, the latch device and the lock striker remain engaged, thereby preventing the front door 1 from opening.

Figure 9:
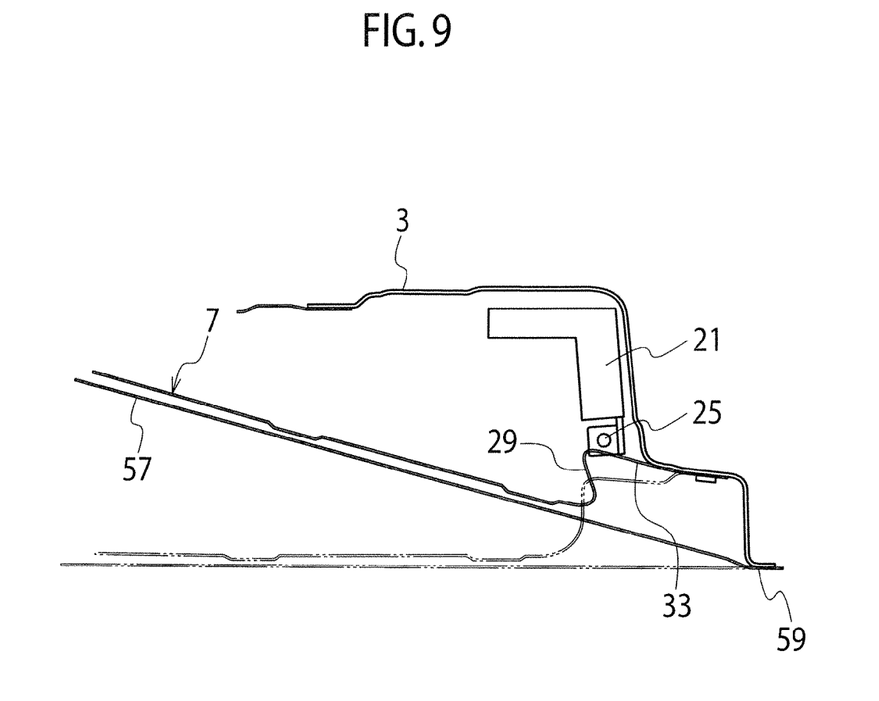
FIG. 9 is a cross-sectional view of the front door taken along the Y-Y line of FIG. 5, with the door outer panel and the stiffener being deformed upon input of the load toward the inner side in the vehicle width direction, and shows a final stage of the deformation.

Moreover, even in a state where the deformation is further advanced as shown in FIG. 9, the above-mentioned state in Part (b) of FIG. 8 is kept and the latch device and the lock striker remain engaged, thereby preventing the front door 1 from opening.

Next, a comparative example will be described with reference to FIGS. 10 and 11. In the comparative example, the locking member 23 according to the present invention is not provided. Note that, in FIGS. 10 and 11, portions having the same structure as those of the embodiment are denoted by the same reference numerals, and a description thereof will be omitted.

Figure 10A:
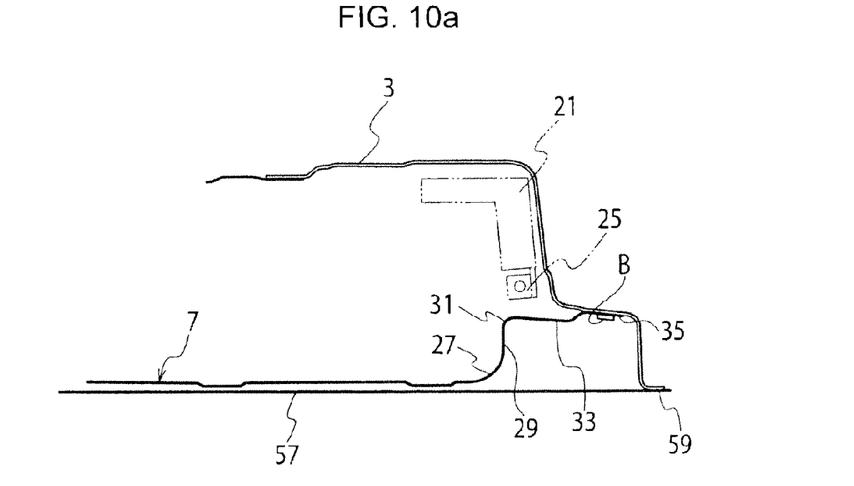
Figure 10B:
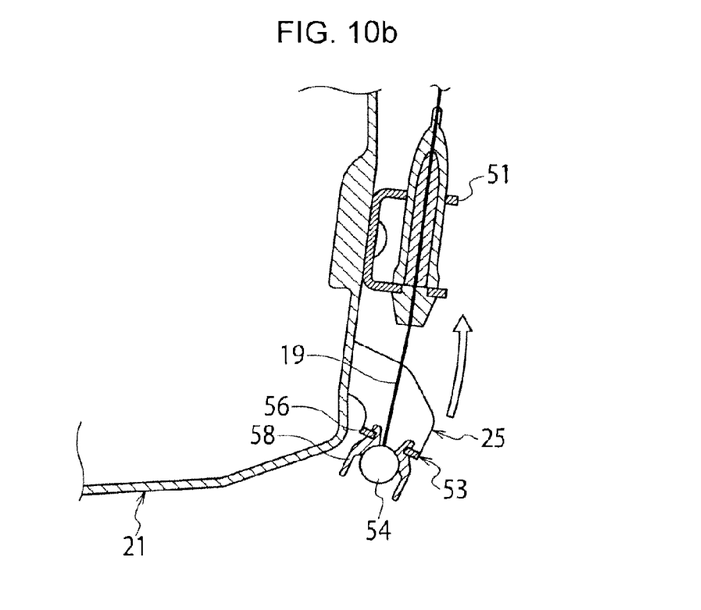

As shown in Parts (a) and (b) of FIG. 10, in a normal state where a load is yet to be inputted to the door outer panel 57 and the outside handle 11, the lock lever 25 is disposed at a lower end position.

Figure 11A:
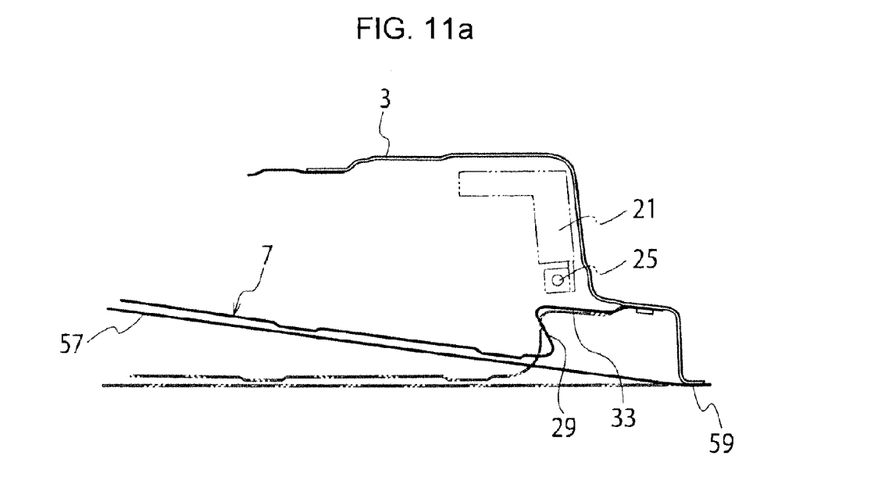
Figure 11B:
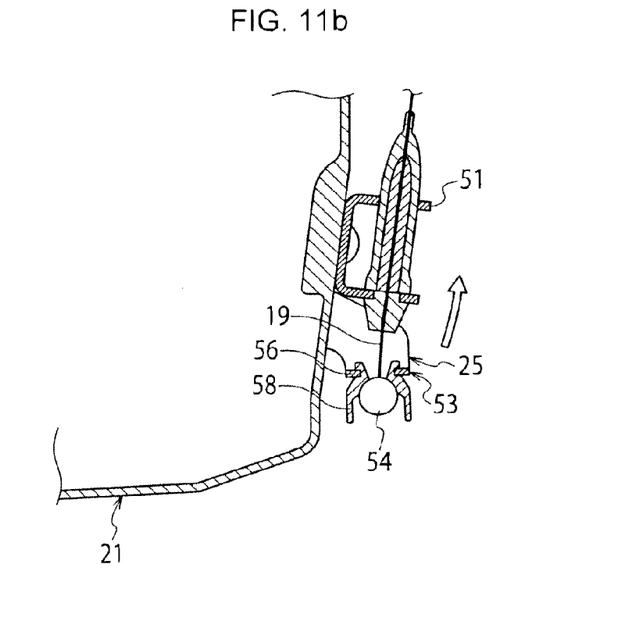

Then, as shown in Part (a) of FIG. 11, when a load is inputted to the door outer panel 57 and the outside handle 11, the lock lever 25 is moved upward as shown in Part (b) of FIG. 11. In this way, the latch device and the lock striker is disengaged from each other, thereby opening the front door 1.

Operations and effects according to the embodiment will be described below.

(1) In the stiffener 7 serving as a reinforcing member, the vehicle width direction wall portion 29 extending in the vehicle width direction and the front-rear direction wall portion 33 extending in the vehicle front-rear direction from the vehicle width direction inner end 31 of the vehicle width direction wall portion 29 are formed, and the locking member 23 is provided on the front-rear direction wall portion 33 at a portion facing the lock lever (movable member) 25.

Accordingly, when a load is inputted from a lateral side to the front door 1, the vehicle width direction wall portion 29 of the stiffener 7 is deformed to be bent in such a way as to fall in the vehicle front-rear direction. For this reason, the outward deformation of the vehicle width direction wall portion 29 in the vehicle width direction is suppressed, and the locking member 23 provided on the front-rear direction wall portion 33 is deformed and moved inward in the vehicle width direction, thereby preventing the movement of the lock lever 25. Hence, even when the load is transmitted to the outside handle 11, the engagement between the front door 1 and the vehicle body by the latch device is maintained and thus the front door 1 does not open. As described above, the present invention can prevent the front door 1 from opening, with a simple door structure, even when a certain load toward an inner side of the vehicle is inputted to the outside handle 11.

(2) The locking member 23 is formed separately from the front-rear direction wall portion 33. Accordingly, since the front-rear direction wall portion 33 is reinforced by the locking member 23, the outward deformation of the vehicle width direction wall portion 29 in the vehicle width direction can be further suppressed.

(3) The upper bead portion 15 and the lower bead portion 17 extending to the vehicle width direction inner end 31 are provided to the vehicle width direction wall portion 29, and thus the vehicle width direction inner end 31 is formed as a fragile portion. Hence, when a load is inputted from a lateral side to the front door 1, the bending deformation of the vehicle width direction wall portion 29 is further facilitated.

(4) The vehicle width direction wall portion 29 is formed to have a top-bottom width dimension gradually reduced toward an inner side in the vehicle width direction, and to be the minimum at the vehicle width direction inner end 31. Hence, when a load is inputted from a lateral side to the front door 1, the bending deformation of the vehicle width direction wall portion 29 is further facilitated.

INDUSTRIAL APPLICABILITY

A vehicle door structure according to the present invention can prevent a door from opening, with a simple door structure, even when a certain load toward an inner side of the vehicle is inputted to an outside handle.

The invention claimed is:

1. A door structure of a vehicle door, comprising:
an outside handle turnably attached to a door outer panel;
a movable member being capable of moving together with a turning of the outside handle;
a latch device configured to, respectively, engage and disengage the door with and from a vehicle body in conjunction with the movement of the movable member; and
a reinforcing member provided between the door outer panel and a door inner panel, wherein
a vehicle width direction wall portion and a front-rear direction wall portion are formed in the reinforcing member, the vehicle width direction wall portion extending in a vehicle width direction, the front-rear direction wall portion, bending from an inner end, in the vehicle width direction, of the vehicle width direction wall portion and extending in a vehicle front-rear direction, and
a locking member is provided on the front-rear direction wall portion, faces the movable member and engages the movable member, after a load is applied to the outside handle and the door outer panel thereby deforming the door outer panel,
wherein the locking member prevents the movement of the movable member by said outside handle after said deforming the door outer panel.

2. The door structure according to claim 1, wherein the locking member is formed separately from the front-rear direction wall portion.

3. The door structure according to claim 1, wherein the inner end of the vehicle width direction wall portion is formed as a fragile portion, which is more fragile than the vehicle width direction wall portion, by providing the vehicle width direction wall portion with a bead portion.

4. The door structure according to claim 1, wherein a top-bottom dimension of the vehicle width direction wall portion is reduced toward an inner side of the door in the vehicle width direction.

5. The door structure according to claim 1, wherein an upper end of the locking member is bent and extends inward in the vehicle width direction.

* * * * *